(12) United States Patent
Wiatrowski et al.

(10) Patent No.: US 9,313,824 B2
(45) Date of Patent: Apr. 12, 2016

(54) SYSTEM AND METHOD FOR INTERRUPTING COMMUNICATIONS WITHIN A COMMUNICATION SYSTEM

(75) Inventors: David G. Wiatrowski, Woodstock, IL (US); Thomas B. Bohn, McHenry, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 1029 days.

(21) Appl. No.: 12/533,219

(22) Filed: Jul. 31, 2009

(65) Prior Publication Data

US 2011/0028084 A1 Feb. 3, 2011

(51) Int. Cl.
*H04B 3/36* (2006.01)
*H04B 7/14* (2006.01)
*H04W 76/06* (2009.01)
*H04W 76/00* (2009.01)
*H04W 76/02* (2009.01)

(52) U.S. Cl.
CPC .......... *H04W 76/066* (2013.01); *H04W 76/005* (2013.01); *H04W 76/023* (2013.01)

(58) Field of Classification Search
USPC .......................................................... 455/7
See application file for complete search history.

(56) References Cited

U.S. PATENT DOCUMENTS

| 7,203,207 | B2 | 4/2007 | Hiben et al. | |
| 2003/0147367 | A1* | 8/2003 | Pucheu et al. | 370/337 |
| 2006/0013188 | A1 | 1/2006 | Wiatrowski et al. | |
| 2006/0073847 | A1* | 4/2006 | Pirzada et al. | 455/556.2 |
| 2007/0053316 | A1* | 3/2007 | Wiatrowski et al. | 370/321 |
| 2007/0206533 | A1* | 9/2007 | Wiatrowski et al. | 370/329 |

FOREIGN PATENT DOCUMENTS

| CN | 1852573 A1 | 10/2006 |
| CN | 101287268 A | 10/2008 |

OTHER PUBLICATIONS

U.S. Appl. No. 12/136,177, filed Jun. 10, 2008.
International Preliminary Report on Patentability and Written Opinion for counterpart International Patent Application No. PCT/US2010/039729 issued on Jan. 31, 2012.
PCT International Search Report Dated Nov. 15, 2010.

(Continued)

*Primary Examiner* — Ankur Jain
(74) *Attorney, Agent, or Firm* — Barbara R. Doutre; Kenneth Haas; Daniel R. Bestor

(57) ABSTRACT

A method for interrupting active communications within a communication network, the method comprising in one embodiment: operating a communication device to terminate communication activity in response to receiving an interrupt request from an interrupting device; operating a repeater to wake up and initiate message communication activity in response to receiving a base station downlink activation message from the interrupting device; and operating the interrupting device to transmit one or more messages on a receive frequency of the repeater. The method for interrupting active communications within a communication network comprising in an alternate embodiment: operating a repeater, in response to receiving an interrupt request from an interrupting device, to clear each channel hosted by the repeater: informing the interrupting device by the repeater that all channels have been cleared; de-keying the repeater; operating the interrupting device to transmit one or more communications on a transmission frequency of the repeater.

7 Claims, 5 Drawing Sheets

(56) References Cited

OTHER PUBLICATIONS

"Terrestrial Trunked Radio (TETRA): Technical Requirements for Direct Mode Operation (DMO); Part 3: Mobile Stationn to Mobile Station (MS-MS) Air Interface (AI) Protocol; Final Draft ETSI EN300396-3"; ETSI Standards, Lis, Sophia Antipolis, Cedex, France; vol. TETRA, No. V1.3.0, Apr. 1, 2006, XP014033803; ISSN:0000-0001.

"Electromagnetic Compativility and Radio Spectrum Matters (ERM); Digital Mobile Radio (DMR) Systems; Part 2; DMR Voice and Generic Services and Facilities; ETSI TS 102 361-2", ETSI Standards, Lis, Sophia Antipolis, Cedex, France; vol. ERM-TG-DMR, No. V1.2.6; Dec. 1, 2007, XP01404098 ISSN:0000-0001.

Chinese Office Action Dated Nov. 28, 2013 for Counterpart Application CN201080019447.3.

European Communication Dated Dec. 9, 2013 for Counterpart Application EP 10732556.5-1854.

Office Action mailed Apr. 11, 2013 in counterpart Australian Patent Application No. 2010276724.

Second Office Action with translated Comments—mailed Jun. 11, 2014 in counterpart Chinese Application No. 201080019445.3.

* cited by examiner

| 505 | ALLOW NON-EMG INTERRUPTS ALLOW EMG INT EMG | ACTIVE CALLS ON REPEATER | |
|---|---|---|---|
| | | ALL ARE NON-EMERGENCY CALLS | AT LEAST ONE IS AN EMERGENCY CALL |
| | REPEATER INTERRUPT | ALLOW THE REPEATER INTERRUPT | DENY THE REPEATER INTERRUPT |
| INTERRUPT REQUEST | EMERGENCY REPEATER INTERRUPT | ALLOW THE EMERGENCY REPEATER INTERRUPT | ALLOW THE EMERGENCY REPEATER INTERRUPT |

| 510 | DENY NON-EMG INTERRUPTS ALLOW EMG INT EMG | ACTIVE CALLS ON REPEATER | |
|---|---|---|---|
| | | ALL ARE NON-EMERGENCY CALLS | AT LEAST ONE IS AN EMERGENCY CALL |
| | REPEATER INTERRUPT | DENY THE REPEATER INTERRUPT | DENY THE REPEATER INTERRUPT |
| INTERRUPT REQUEST | EMERGENCY REPEATER INTERRUPT | ALLOW THE EMERGENCY REPEATER INTERRUPT | ALLOW THE EMERGENCY REPEATER INTERRUPT |

| 515 | ALLOW NON-EMG INTERRUPTS DENY EMG INT EMG | ACTIVE CALLS ON REPEATER | |
|---|---|---|---|
| | | ALL ARE NON-EMERGENCY CALLS | AT LEAST ONE IS AN EMERGENCY CALL |
| | REPEATER INTERRUPT | ALLOW THE REPEATER INTERRUPT | DENY THE REPEATER INTERRUPT |
| INTERRUPT REQUEST | EMERGENCY REPEATER INTERRUPT | ALLOW THE EMERGENCY REPEATER INTERRUPT | DENY THE EMERGENCY REPEATER INTERRUPT |

| 520 | DENY NON-EMG INTERRUPTS DENY EMG INT EMG | ACTIVE CALLS ON REPEATER | |
|---|---|---|---|
| | | ALL ARE NON-EMERGENCY CALLS | AT LEAST ONE IS AN EMERGENCY CALL |
| | REPEATER INTERRUPT | DENY THE REPEATER INTERRUPT | DENY THE REPEATER INTERRUPT |
| INTERRUPT REQUEST | EMERGENCY REPEATER INTERRUPT | ALLOW THE EMERGENCY REPEATER INTERRUPT | DENY THE EMERGENCY REPEATER INTERRUPT |

*FIG. 5*

SYSTEM AND METHOD FOR INTERRUPTING COMMUNICATIONS WITHIN A COMMUNICATION SYSTEM

FIELD OF THE DISCLOSURE

The present disclosure relates generally to communication systems, and more particularly, to a system and method for interrupting active communications within a communication system.

BACKGROUND

Wireless communication systems (e.g., time division multiple access (TDMA) systems, frequency division multiple access (FDMA) systems, or the like) generally comprise a set of radios and a set of base stations (also referred to as "repeaters"). The radios, which may be mobile radios, portable radios or the like, are generally the endpoints of a communication path, while base stations are typically stationary intermediates by which a communication path to a radio device is established or maintained.

When a communication device such as a subscriber unit or a repeater is transmitting communications, there may be instances when interrupting the communication device may be important and/or beneficial. For example, a first police officer needing back up may need to interrupt a second police officer that is engaged in a call. In such an instance, it would be important to have a mechanism to interrupt the second police officer to notify the second officer that the first police officer requires assistance.

Accordingly, there is a need for interrupting a communication device operating in various modes in a communications system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 includes tables summarizing configurations of various combinations of repeater interrupt parameters and the result of interrupt requests in accordance with some embodiments.

Figure 1:
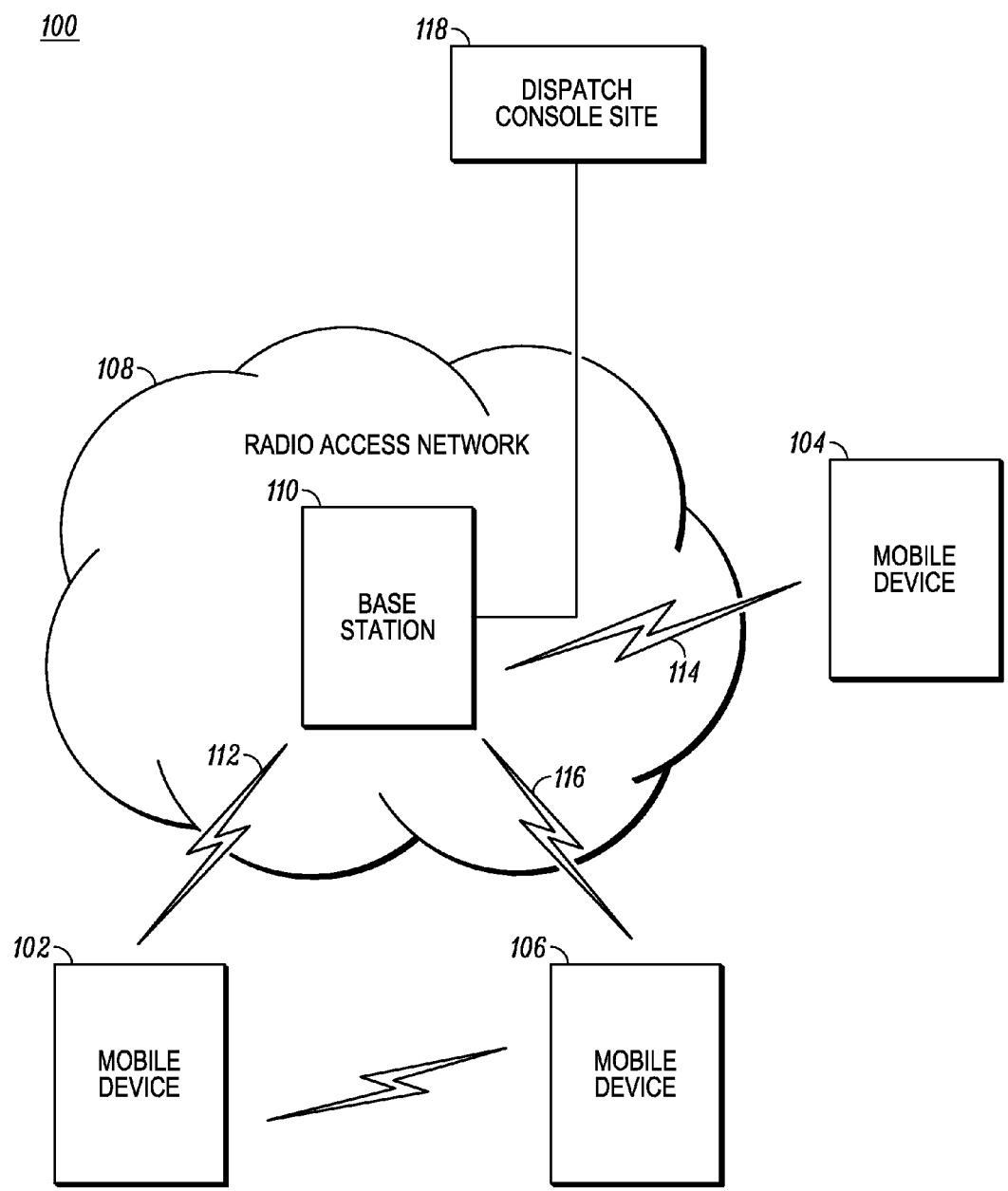
FIG. 1 is a block diagram of a communication system capable of operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method is provided herein for interrupting active communications within a communication network, the method comprising in one embodiment: operating a communication device to terminate communication activity in response to receiving an interrupt request from an interrupting device; operating a repeater to wake up and initiate message communication activity in response to receiving a notification from the interrupting device; and operating the interrupting device to transmit one or more messages on a receive frequency of the repeater. A method for interrupting active communications within a communication network, the method comprising in an alternate embodiment: operating a repeater, in response to receiving an interrupt request from an interrupting device, to clear each channel hosted by the repeater: informing the interrupting device by the repeater that all channels have been cleared; de-keying the repeater; operating the interrupting device to transmit one or more communications on a transmission frequency of the repeater.

FIG. 1 is a block diagram of a communication system 100 that can be used for implementing some embodiments. Communication system 100 comprises mobile communication devices 102, 104, and 106, which can be, for example, portable or mobile radios, personal digital assistants, cellular telephones, video terminals, portable computers with a wireless modem, or any other wireless devices. For purposes of the following discussions, the communication devices will be referred to as "radios" or "subscriber units", but they are also referred to in the art as subscribers, mobile stations, mobile equipment, mobiles, portables, handsets, etc.

Radios 102, 104, and 106 communicate over a radio access network 108 via wireless communication resources. It will be appreciated by those of ordinary skill in the art that any type of network is within the scope of the teachings herein. Thus, the radio access network 108 can comprise infrastructure such as, but not limited to, base stations (with a single base station 110 shown for clarity), base station controllers (not shown), network elements (such as a mobile switching center, home location register, visitor location register, etc.), and the like, to facilitate the communications between radios having access to the radio access network 108. As shown in FIG. 1, base station 110 can also be configured to communicate with one or more dispatch console sites 118.

The wireless communication resources used for communication between the base station 110 and radios 102, 104, and 106 can include any type of communication resource such as, for example, radio frequency (RF) technologies, including, but not limited to TDMA; Code Division Multiple Access (CDMA), FDMA, Orthogonal Frequency Division Multiple Access (OFDMA) and the like. Other wireless technologies, such as those now known or later to be developed and including, but not limited to, infrared, Bluetooth, electric field, electromagnetic, or electrostatic transmissions, also offer suitable substitutes.

In the illustrated communication system 100, radios 102, 104, and 106 communicate with one another either in "repeater mode" or in "direct mode." In repeater mode, the radios 102, 104, and 106 communicate with each other by radio 102 establishing a wireless link or radio connection 112 with base station 110 over an available RF channel, radio 104 establishing a wireless link 114 with base station 110 over an available RF channel, and radio 106 establishing a wireless link 116 with base station 110 over an available RF channel. As is well understood in the art, base station 110 comprises one or more repeater devices that receive a signal from one of the radios 102, 104, or 106 over the respective link 112, 114, or 116 and retransmit the signal to one or more of the other radios. Communication from a radio 102, 104, or 106 to base station 110 are generally referred to as being inbound while communications from base station 110 to a radio 102, 104, or 106 are generally referred to as being outbound.

As also shown in FIG. 1, in direct mode (also commonly referred to as talkaround mode), radios (e.g., radios 102 and 106) communicate directly, without a base station, by establishing a wireless link with one another. As will be understood from the discussions below, the present disclosure is equally applicable to both direct mode communications and communications via base station 110.

While one embodiment of a communication system is illustrated in FIG. 1, those skilled in the art will appreciate that the system 100 can also include various other elements not shown in FIG. 1. For example, while three radios and one base station is shown for ease of illustration, those skilled in the art will appreciate that any number of radios and any number of base stations can be supported by a radio network. It will further be appreciated by those of ordinary skill in the art that one or more stand-alone repeaters (i.e. not part of a base station) can be included in a communication system (not shown).

A Transmitter Interrupt feature recently developed is capable of remotely "dekeying" a subscriber unit (SU) that is transmitting on a radio channel. For example, U.S. patent application Ser. No. 12/136,177 to Wiatrowski et al, entitled "System and Method for Interrupting a Transmitting Device in a Communication System", filed Jun. 10, 2008, assigned to the assignee of the present invention, and incorporated by reference herein describes such a feature. The Transmitter Interrupt feature can operate in either direct mode (i.e., subscriber unit to subscriber unit directly, without a repeater) or repeater mode (i.e., subscriber unit to subscriber unit, through a repeater). Once the interrupting subscriber unit has transmitted the interrupt request and the interrupted radio has dekeyed, the subscriber unit's transmit channel is available for the interrupting subscriber unit to begin a transmission.

This "Transmitter Interrupt" feature allows a subscriber unit's transmission to be terminated remotely. A subscriber unit remotely terminates another subscriber unit's direct/talkaround mode voice transmission and initiates its own direct/talkaround mode transmission. The repeater is not involved. Alternatively, a subscriber unit remotely terminates another subscriber unit's repeater mode voice transmission and initiates its own repeater mode transmission. The repeater does not dekey, but does assist with the interrupt process.

This feature works well for an interrupting subscriber unit that is receiving a direct mode transmission and desires to initiate a direct mode transmission and it also works well for an interrupting subscriber unit that is receiving a repeater mode transmission and desires to initiate a repeater mode transmission.

However, there are two additional scenarios that are not addressed by the above described operation. The first is an interrupting subscriber unit that is receiving a talkaround mode transmission and desires to interrupt and initiate a repeater mode transmission. In other words, a subscriber unit needs to remotely terminate another subscriber unit's direct/talkaround mode voice transmission and initiate its own repeater mode transmission. Those of ordinary skill in the art will appreciate that this scenario requires the repeater to be awakened after the interrupted subscriber unit has de-keyed.

The second scenario not addressed by the above described operation is an interrupting subscriber unit that is receiving a repeater mode transmission and desires to interrupt and initiate a talkaround mode transmission. In other words, a subscriber unit needs to remotely terminate another subscriber unit's repeater mode voice transmission (both the subscriber unit and the repeater must cease transmitting) and initiate its own direct/talkaround mode transmission. The repeater in this scenario must dekey. The direct/talkaround frequency is equal to the repeater's transmit frequency. Possibly, calls in multiple channels are affected. This scenario can be problematic for two reasons. First, remotely dekeying a transmitting Subscriber unit in repeater mode, for example, in accordance with U.S. patent application Ser. No. 12/136,177, referenced above only clears the repeater inbound channel, but not the repeater outbound channel which is the channel that the interrupting subscriber unit desires to use for its talkaround transmission. Secondly, the repeater may be carrying multiple simultaneous transmissions (e.g., in different timeslots on a carrier frequency for TDMA, on different carrier frequencies for FDMA, and in different codes on a carrier frequency for CDMA), so clearing one channel may not place the repeater in a condition that would cause it to dekey and yield the outbound channel for the interrupting subscriber unit's talkaround mode transmission.

The embodiments described herein provide a method for interrupting a repeater mode transmission for a talkaround mode transmission and a method for interrupting a talkaround mode transmission for a repeater mode transmission.

Figure 2:
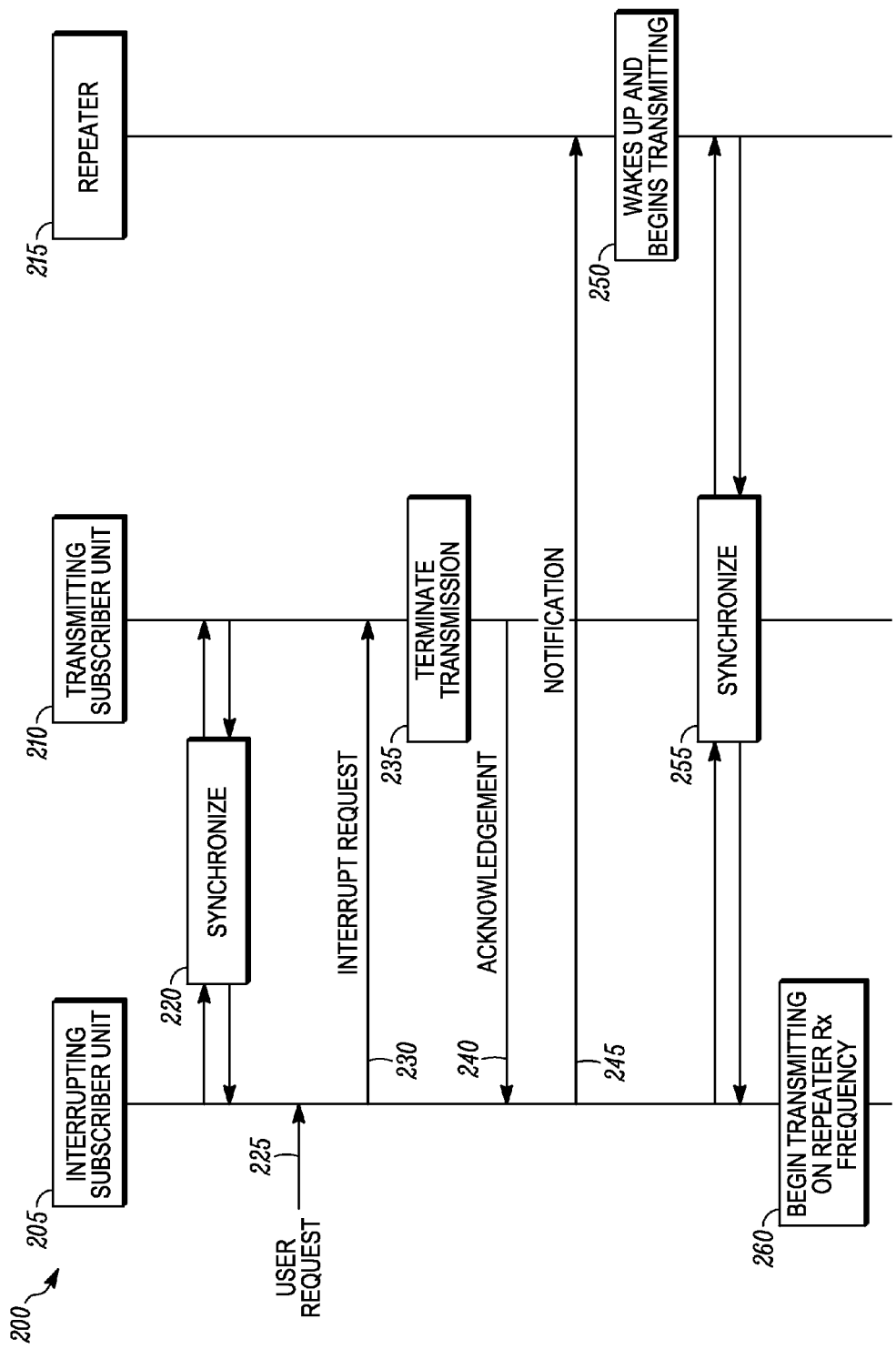
FIG. 2 is a messaging diagram illustrating a method for interrupting a talkaround mode transmission for a repeater mode transmission in accordance with some embodiments.

FIG. 2 is a messaging diagram illustrating a method 200 for interrupting a talkaround mode transmission for a repeater mode transmission in accordance with some embodiments. In other words, a subscriber unit needs to remotely terminate another subscriber unit's direct/talkaround mode voice transmission and initiate its own repeater mode transmission. It will be appreciated by those of ordinary skill in the art that in some embodiments a received synchronization pattern identifies each signal as subscriber-sourced or repeater-sourced. (See, for example, U.S. Pat. No. 7,203,207 to Hiben et al entitled "Method for Selecting an Operating Mode based on a Detected Synchronization Pattern," granted Apr. 10, 2007, and assigned to the assignee of the present invention.) (See further, for example, European Telecommunications Standards Institute (ETSI) Digital Mobile Radio (DMR) specification (ETSI TS 102 361). Any of the ETSI standards or specifications referred to herein may be obtained at http://www.etsi.org/WebSite/Standards/Standard.aspx or by contacting ETSI at ETSI Secretariat, 650, route des Lucioles, 06921 Sophia-Antipolis Cedex, FRANCE.)

It will further be appreciated by those of ordinary skill in the art that according to some embodiments a subscriber unit user has a user interface, for example a switch, button, menu option or an equivalent, that allows the user to designate "direct/talkaround" versus "repeater" mode for a next transmission.

As illustrated in FIG. 2, the method 200 begins with an interrupting subscriber unit 205 synchronizing itself with a transmitting subscriber unit 210 (operation 220). Next, upon user request 225, the interrupting subscriber unit 205 transmits an interrupt request 230 to the transmitting subscriber unit 210 on the talkaround (i.e., repeater transmission (Tx)) frequency. (See, for example, for example, U.S. patent application Ser. No. 12/136,177, referenced above.) In operation 235, the interrupted subscriber unit 210 receives the interrupt request 230 and terminates its transmission with an acknowledgement 240. The acknowledgement, for example, can be a link control (LC) acknowledgement (ACK). Next, the interrupting subscriber unit 205, upon receiving the acknowledgement 240, transmits a notification 245 to the repeater 215 on the repeater's receive frequency. The notification 245, for example, can be a base station downlink activation (BS_Dwn_Act) message. In response to receiving the notification 245, the repeater 215, wakes up, and begins transmitting (operation 250) on its transmit frequency. Optionally (not shown), the repeater 215 reserves the channel with a Call Hangtime message for the interrupting subscriber unit 205. Next, (operation 255) the interrupting subscriber unit 205 synchronizes itself with the repeater 215; and (operation 260) begins transmitting on the repeater receive (Rx) frequency.

Figure 3:
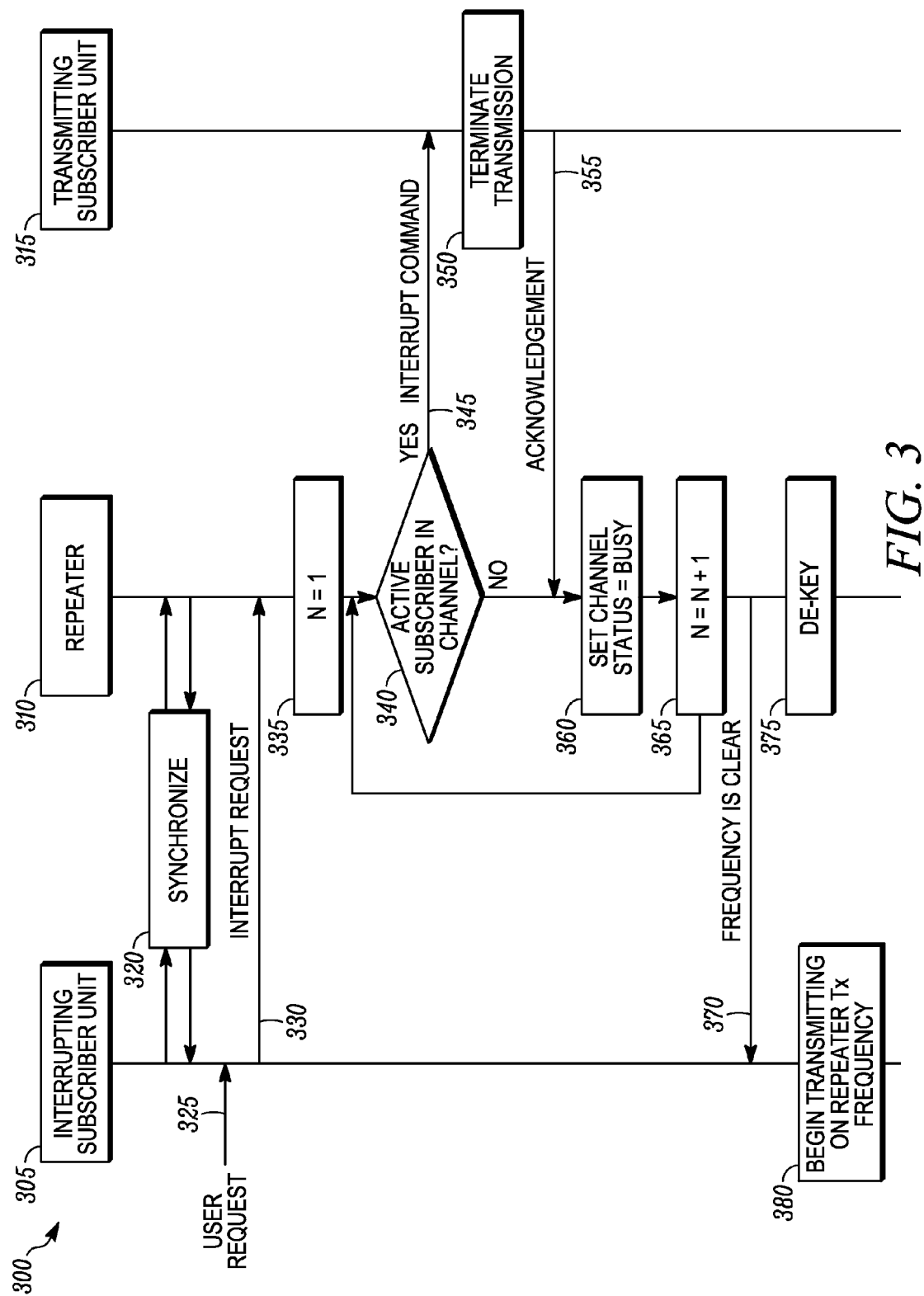
FIG. 3 is a messaging diagram illustrating a method for interrupting a repeater mode transmission for a talkaround mode transmission in accordance with some embodiments.

FIG. 3 is a messaging diagram illustrating a method 300 for interrupting a repeater mode transmission for a talkaround mode transmission in accordance with some embodiments. In other words, a subscriber unit needs to remotely terminate another subscriber unit's repeater mode voice transmission and initiate its own direct/talkaround mode transmission. As in FIG. 2 previously herein, it will be appreciated by those of ordinary skill in the art that in some embodiments a received synchronization pattern identifies each signal as subscriber-sourced or repeater-sourced. It will further be appreciated by those of ordinary skill in the art that according to some embodiments a subscriber unit user has a switch that designates "direct/talkaround" versus "repeater" mode for next transmission.

As illustrated in FIG. 3, the method 300 begins with an interrupting subscriber unit 305 synchronizing itself with a transmitting repeater 310 (operation 320). Upon a user request 325, the interrupting subscriber unit 305 transmits an interrupt request 330 to the repeater 310 on the repeater receiver (Rx) frequency. In accordance with some embodiments, when all channels have an active subscriber transmission, the interrupt request 330 is transmitted on any of the channels. In accordance with some embodiments, when at least one channel is idle, the interrupt request 330 is transmitted on any of the idle channels.

In response to receiving the interrupt request 330, the repeater 310 operates for each channel 335 hosted by the repeater 310, the repeater, in operation 340, determines if there is an active subscriber transmission in the channel. It will be appreciated by those of ordinary skill in the art that the channels can be frequencies in FDMA systems, frequencies and timeslots in TDMA systems, or frequencies and codes in CDMA systems, and the like. When there is an active subscriber unit 315 in the channel, the repeater 310 transmits an interrupt command 345 to the subscriber unit 315 in that channel on the repeater's transmit frequency. When the interrupted subscriber unit 315 receives the interrupt command 345, it terminates its transmission with an acknowledgement 355, such as a LC ACK, on the repeater's receive frequency. When the repeater 310 receives the acknowledgement 355 (in each channel) and if the channel is idle, the repeater 310 changes the channel status to busy (operation 360 (e.g., by setting an access type (AT) bit, defined in the ETSI-DMR specification (ETSI TS 102 361) referenced previously herein, to busy and/or transmitting a call hangtime message that reserves the channel for a NULL group). This will prevent other subscriber units from starting a new transmission while the repeater is attempting to clear down all activity on the frequency. The clearing continues for each channel (operation 365). It will be appreciated by those of ordinary skill in the art that although the clearing of each channel is illustrated sequentially in FIG. 3, alternatively, the interrupt commands can be sent out in parallel and the repeater 310 waits to collect all the LC ACKs accordingly.

Once all channels are idle, the repeater 310 informs (using the repeater's transmit frequency) the interrupting subscriber unit 305 that the frequency has been cleared of all activity (operation 370) and de-keys (operation 375). The interrupting subscriber unit 305 determines that the repeater 310 has dekeyed and begins transmitting on the talkaround (repeater Tx) frequency (operation 380).

Figure 4:
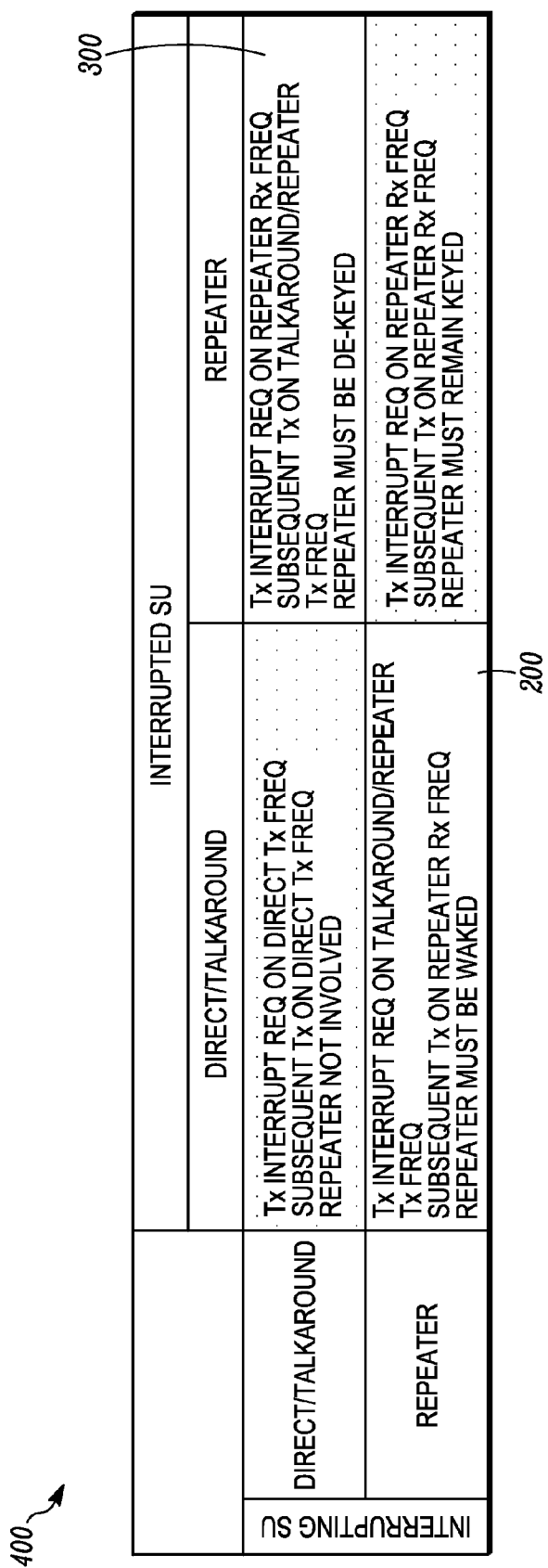
FIG. 4 is a table summarizing the various scenarios and operations of an interrupting subscriber unit, and interrupted subscriber unit, and a repeater in accordance with some embodiments.

FIG. 4 is a table 400 summarizing the various scenarios and operations of an interrupting subscriber unit, and interrupted subscriber unit, and a repeater in accordance with some embodiments as previously described.

Note that the system may be provisioned such that only Emergency Voice Interrupts are honored. This is discussed further, below.

Implementation of some embodiments includes transmitting information elements within a link control message either as a separate message or as a portion of another message. The link control message further can include a Control Signaling Block as is known in the art. (see for example, ETSI TS 102 361, as referenced previously herein.)

In accordance with some embodiments, implementation of the present invention includes two new values that may be used in an interrupt type field of an interrupt request Control Signaling BlocK (CSBK):

00101: Repeater Interrupt
00110: Emergency Repeater Interrupt

These new opcodes are used by the interrupting subscriber unit when it desires to interrupt a repeater mode transmission for a talkaround mode transmission. Repeater interrupt is used when the interrupting subscriber unit desires to initiate a non-emergency call and Emergency Repeater Interrupt is used when the interrupting subscriber unit desires to initiate an emergency call. It is understood that in some applications emergency calls are treated as being more important, having higher priority, or demanding more urgency than non-emergency calls, while other applications may not provide such distinction between emergency and non-emergency calls. The CSBK target address is the Open Systems Interconnection (OSI) reference model layer 2 (link layer) address of the repeater and the CSBK source address is the OSI layer 2 address of the interrupting subscriber unit.

These new opcodes are also used by the repeater to inform the subscriber unit that the frequency has been cleared, the repeater will now dekey, and the interrupting subscriber unit can begins its transmission. Repeater interrupt is used when the interrupting subscriber unit requested to initiate a non-emergency call and Emergency Repeater Interrupt is used when the interrupting subscriber unit requested to initiate an emergency call. The CSBK source address is the OSI layer 2 address of the repeater and the CSBK target address is the OSI layer 2 address of the interrupting subscriber.

Since interrupting an ongoing transmission is a serious proposition, with respect to taking a channel resource away from a user that has already been granted use of the resource, it is envisioned that the system operator can provision the extent that these sorts of interruptions may take place.

For example, in one embodiment, the system can be provisioned to allow only "Emergency Repeater Interrupt". This configuration only permits a subscriber unit to interrupt a repeater mode transmission for a talkaround mode transmission for the purposes of starting its own emergency transmission.

In another embodiment, the system can be provisioned to allow "Emergency Repeater Interrupt" to interrupt (or not interrupt) an on going emergency call.

FIG. 5 includes four tables 505, 510, 515, and 520 which summarize the four possible configurations involving these two parameters and the result of the various interrupt requests.

As illustrated in FIG. 5, table 505 illustrates a system configuration in which non-emergency interrupts are allowed and emergency interrupts are allowed. In an example where a repeater interrupt is requested and all of the active calls hosted by the repeater are non-emergency calls, the repeater allows the interrupt process to commence because the repeater is configured to allow non-emergency repeater interrupts. In another example where a repeater interrupt is requested and at least one of the active calls hosted by the repeater is an emergency call, the repeater does not allow the interrupt process to proceed because a non-emergency repeater interrupt is not allowed to interrupt active emergency calls. In yet another example, where an emergency repeater interrupt is requested and all of the active calls hosted by the repeater are non-emergency calls, the repeater allows the interrupt process to proceed because an emergency repeater interrupt is always allowed to interrupt active non-emergency calls. In a final example, where an emergency repeater interrupt is requested and at least one of the active calls hosted by the repeater is an emergency call, the repeater allows the interrupt process to proceed because the repeater is configured to allow emergency repeater interrupts to interrupt active emergency calls.

Table 510 illustrates a system configuration in which non-emergency interrupts are denied and emergency interrupts are allowed. In an example where a repeater interrupt is requested and all of the active calls hosted by the repeater are non-emergency calls, the repeater does not allow the interrupt process to commence because the repeater is configured to deny non-emergency repeater interrupts. Other examples for this configuration are similar to those describing Table 505.

Table 515 illustrates a system configuration in which non-emergency interrupts are allowed and emergency interrupts are denied. In an example, where an emergency repeater interrupt is requested and at least one of the active calls hosted by the repeater is an emergency call, the repeater does not allow the interrupt process to proceed because the repeater is configured to prevent emergency repeater interrupts from interrupting active emergency calls. Other examples for this configuration are similar to those describing Table 505.

Table 520 illustrates a system configuration in which non-emergency interrupts are denied and emergency interrupts are denied. In an example where a repeater interrupt is requested and all of the active calls hosted by the repeater are non-emergency calls, the repeater does not allow the interrupt process to commence because the repeater is configured to deny non-emergency repeater interrupts. In another example where a repeater interrupt is requested and at least one of the active calls hosted by the repeater is an emergency call, the repeater does not allow the interrupt process to proceed because a non-emergency repeater interrupt is not allowed to interrupt active emergency calls. In yet another example, where an emergency repeater interrupt is requested and all of the active calls hosted by the repeater are non-emergency calls, the repeater allows the interrupt process to proceed because an emergency repeater interrupt is always allowed to interrupt active non-emergency calls. In a final example, where an emergency repeater interrupt is requested and at least one of the active calls hosted by the repeater is an emergency call, the repeater does not allow the interrupt process to proceed because the repeater is configured to prevent emergency repeater interrupts from interrupting active emergency calls.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for establishing a new repeater mode call by interrupting active communications within a communication network, the method comprising:
   determining, by an interrupting device, if the active communications being interrupted correspond to a repeater mode or a direct mode;
   responsive to determining that the active communications being interrupted correspond to a direct mode:
   operating the interrupting device to transmit an interrupt request over a repeater transmit frequency, the interrupt request for interrupting the active communications to a communication device that will cause the communication device to terminate the active communications in response to receiving the interrupt request;
   responsive to the communication device terminating the active communications, transmitting an instruction, by the interrupting device, over a repeater receive frequency, to a repeater that will cause the repeater to wake up and initiate message communication activity in response to receiving the instruction; and
   transmitting, by the interrupting device, one or more messages on the receive frequency of the repeater.

2. The method of claim 1, wherein the instruction comprises a base station downlink activation message.

3. The method of claim 1, further comprising prior to transmitting the interrupt request:
   synchronizing the interrupting device with the communication device.

4. The method of claim 1, further comprising prior to the repeater waking up:
   receiving a link control acknowledgement from the communication device at the interrupting device; and
   transmitting a repeater downlink activation message from the interrupting device to a repeater in response to the interrupting device receiving the link control acknowledgement.

5. The method of claim 1, further comprising:
   operating the repeater to reserve at least one communication channel with a call hangtime message for the interrupting device.

6. The method of claim 1, further comprising prior to operating the interrupting device to transmit one or more messages:
   synchronizing the interrupting device with the repeater.

7. The method of claim 1, wherein each channel hosted by the repeater comprises one or more of a frequency, a timeslot, and a code.

* * * * *